US011192562B2

(12) United States Patent
Mori et al.

(10) Patent No.: US 11,192,562 B2
(45) Date of Patent: Dec. 7, 2021

(54) MOVING OBJECT CONTROL SYSTEM AND MOVING OBJECT CONTROL METHOD

(71) Applicant: Hitachi, Ltd., Tokyo (JP)

(72) Inventors: Takuro Mori, Tokyo (JP); Mitsuhiro Kitani, Tokyo (JP); Hiroshi Mine, Tokyo (JP)

(73) Assignee: HITACHI, LTD., Tokyo (JP)

( * ) Notice: Subject to any disclaimer, the term of this patent is extended or adjusted under 35 U.S.C. 154(b) by 252 days.

(21) Appl. No.: 16/483,721

(22) PCT Filed: May 23, 2018

(86) PCT No.: PCT/JP2018/019873
§ 371 (c)(1),
(2) Date: Aug. 5, 2019

(87) PCT Pub. No.: WO2019/058640
PCT Pub. Date: Mar. 28, 2019

(65) Prior Publication Data
US 2020/0023857 A1 Jan. 23, 2020

(30) Foreign Application Priority Data

Sep. 22, 2017 (JP) ............................. JP2017-182193

(51) Int. Cl.
*B60W 50/023* (2012.01)
*B60W 10/04* (2006.01)
(Continued)

(52) U.S. Cl.
CPC .......... *B60W 50/023* (2013.01); *B60W 10/04* (2013.01); *B60W 10/18* (2013.01);
(Continued)

(58) Field of Classification Search
CPC ................................................. B60W 50/023
See application file for complete search history.

(56) References Cited

U.S. PATENT DOCUMENTS 8,359,112 B2 * 1/2013 Kephart .................. G05B 9/03
700/82
8,535,133 B2 9/2013 Fu
(Continued)

FOREIGN PATENT DOCUMENTS

| JP | 2017-033236 A | 2/2017 |
| JP | 6189004 B1 | 8/2017 |
| WO | 2017/022476 A1 | 2/2017 |

OTHER PUBLICATIONS

Extended European Search Report for related European Patent Application No. 18857452.9 dated Dec. 22, 2020 (10 pages).

*Primary Examiner* — Michael A Berns
(74) *Attorney, Agent, or Firm* — Procopio, Cory, Hargreaves & Savitch LLP

(57) ABSTRACT

A device to be controlled used for an operation of a vehicle, a determination device used for controlling the device, and a control information management device different from the determination device are included. The determination device generates control information defining a control content of the device to be controlled, the control information management device includes a control information comparison unit which determines an operating state of the determination device based on the control information, and a control switching unit which changes the control of the determination device based on a determination result of the control information comparison unit, and the control information comparison unit determines, based on the control information and a plurality of pieces of control condition information which define control conditions of the device to be controlled by the determination device, which control condition information among the plurality of pieces of control condition information is to be applied.

11 Claims, 14 Drawing Sheets

(51) Int. Cl.
  *B60W 10/18* (2012.01)
  *B60W 10/20* (2006.01)
  *B60W 30/18* (2012.01)
  *G05B 9/03* (2006.01)

(52) U.S. Cl.
  CPC ............ *B60W 10/20* (2013.01); *B60W 30/18* (2013.01); *G05B 9/03* (2013.01); *B60W 2556/00* (2020.02); *B60W 2710/18* (2013.01); *B60W 2710/20* (2013.01); *B60W 2720/106* (2013.01)

(56) References Cited

U.S. PATENT DOCUMENTS

| | | | |
|---|---|---|---|
| 9,110,838 B2 * | 8/2015 | Martin | G06F 13/122 |
| 10,569,774 B2 * | 2/2020 | Oyama | G05D 1/0274 |
| 10,788,826 B2 * | 9/2020 | Fukuda | G06F 11/20 |
| 2018/0181124 A1 | 6/2018 | Takeshi et al. | |
| 2020/0023857 A1 * | 1/2020 | Mori | G06F 11/20 |

\* cited by examiner

[FIG. 1]
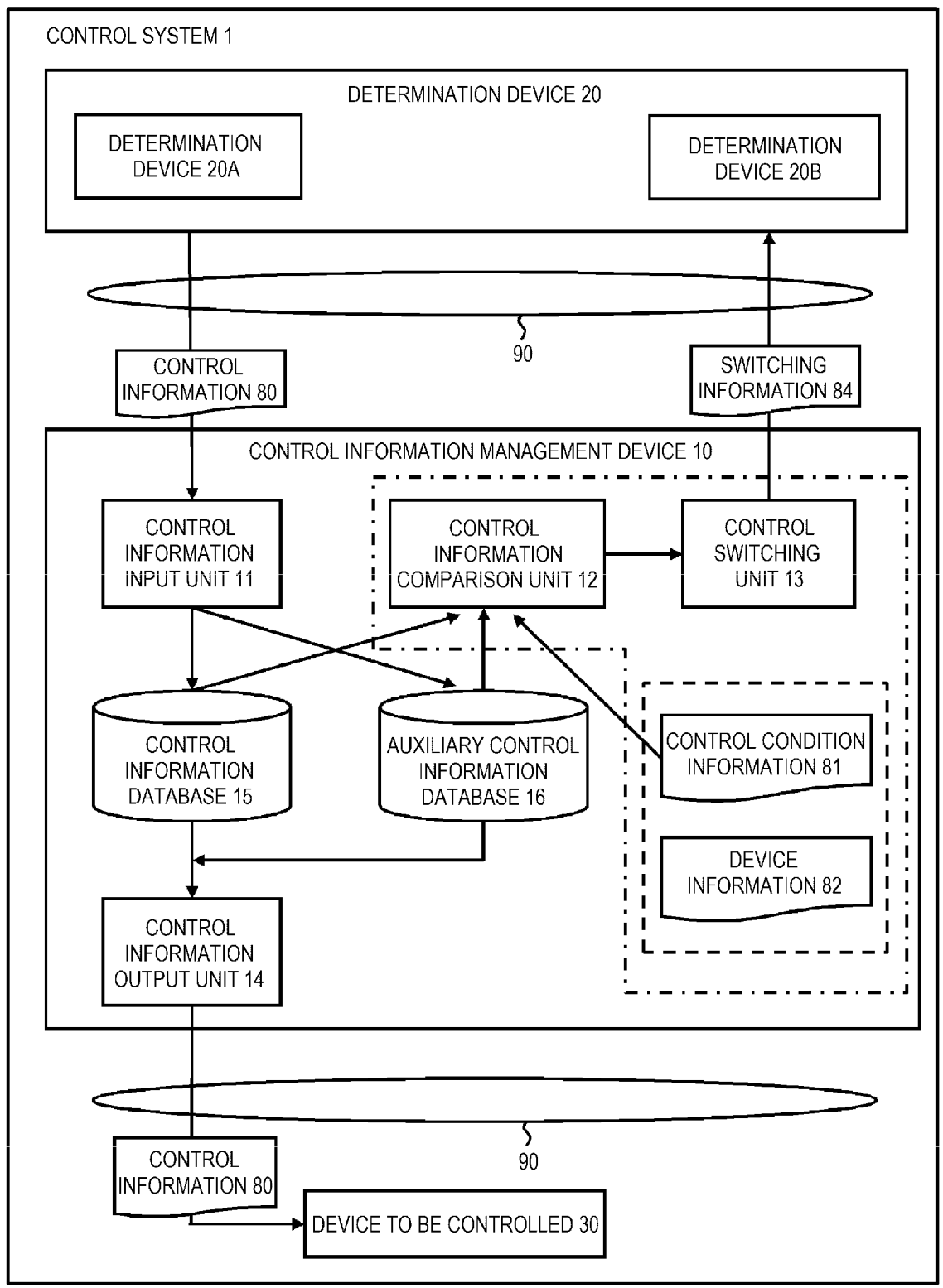

[FIG. 2]
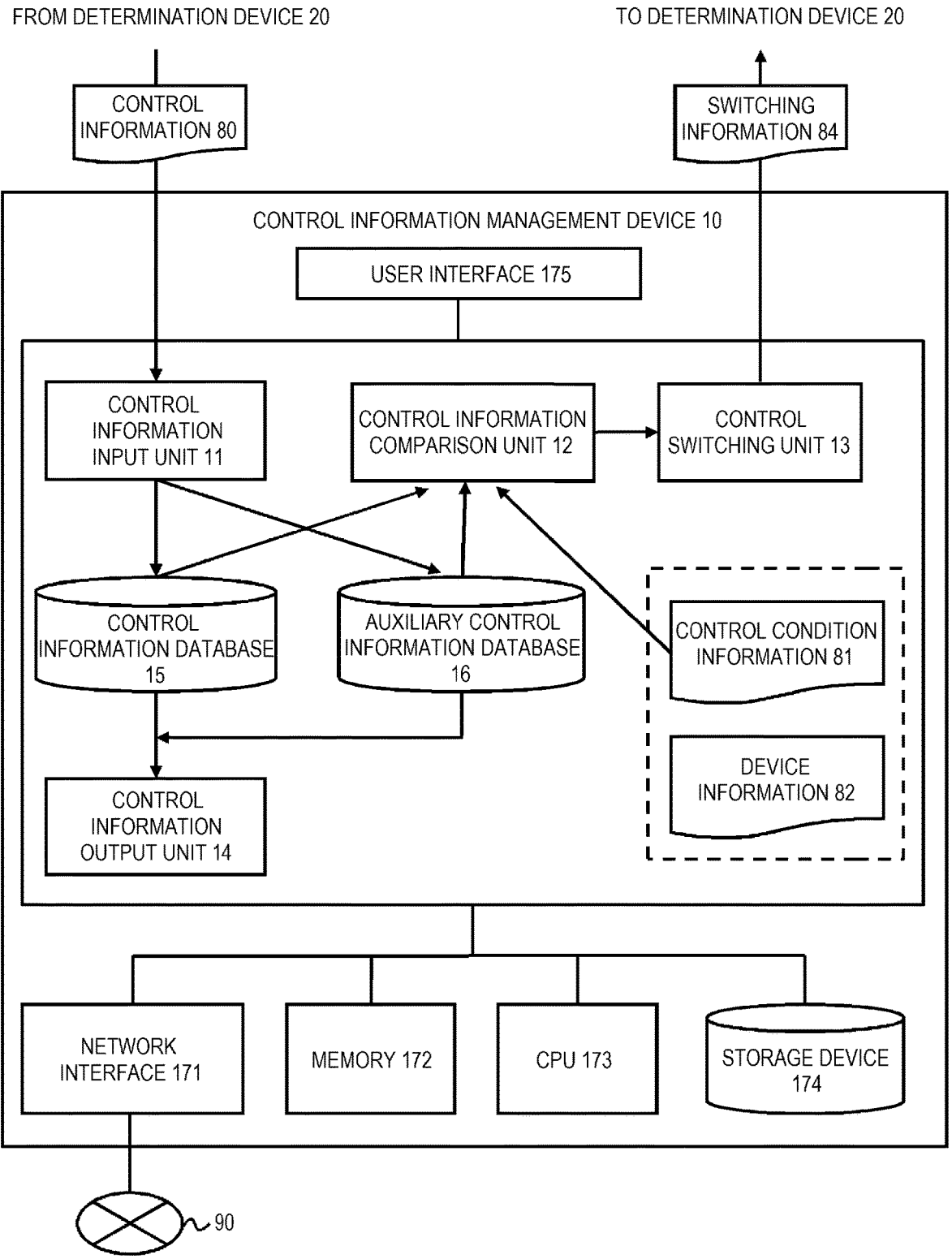

[FIG. 3]
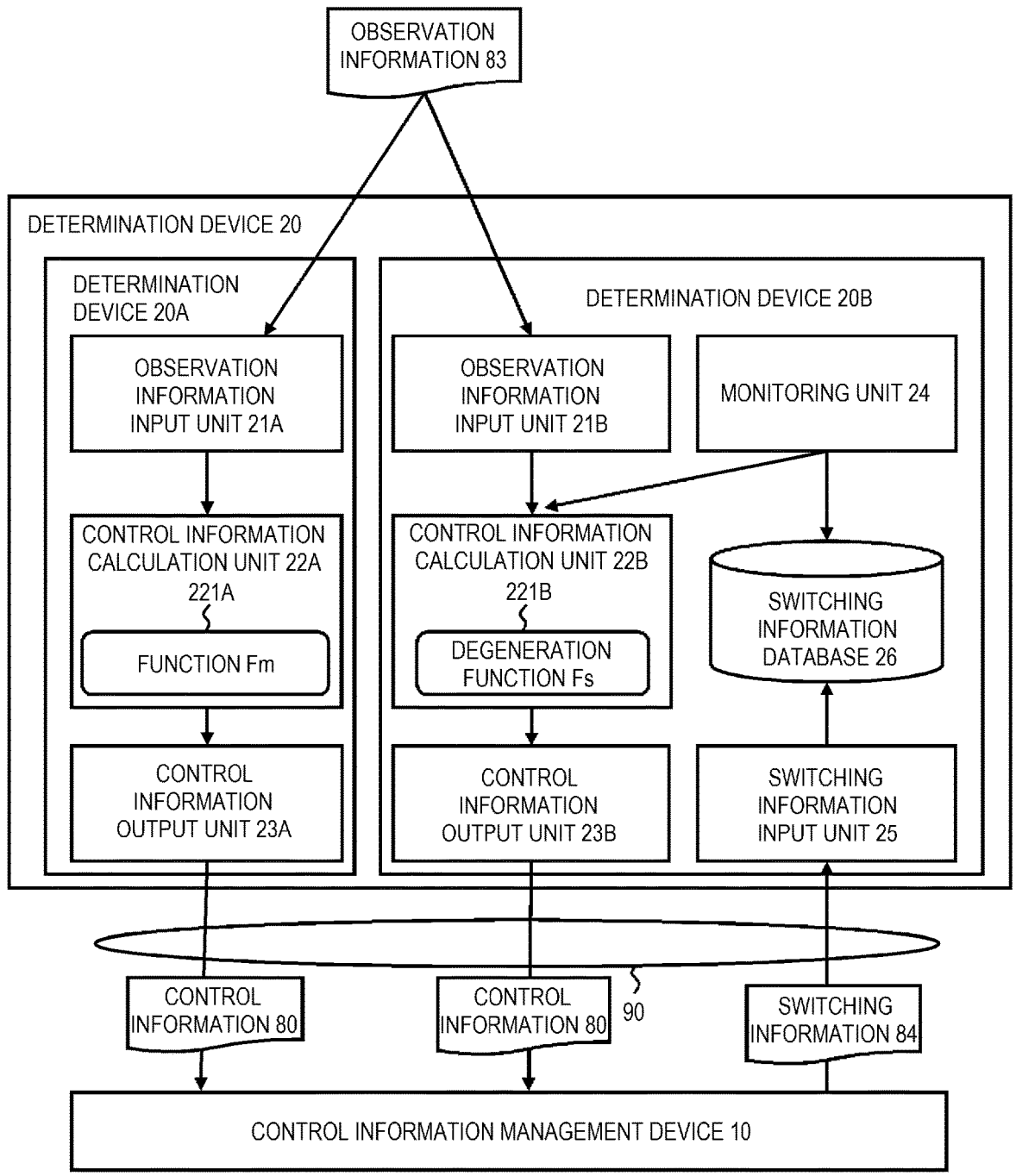

[FIG. 4]
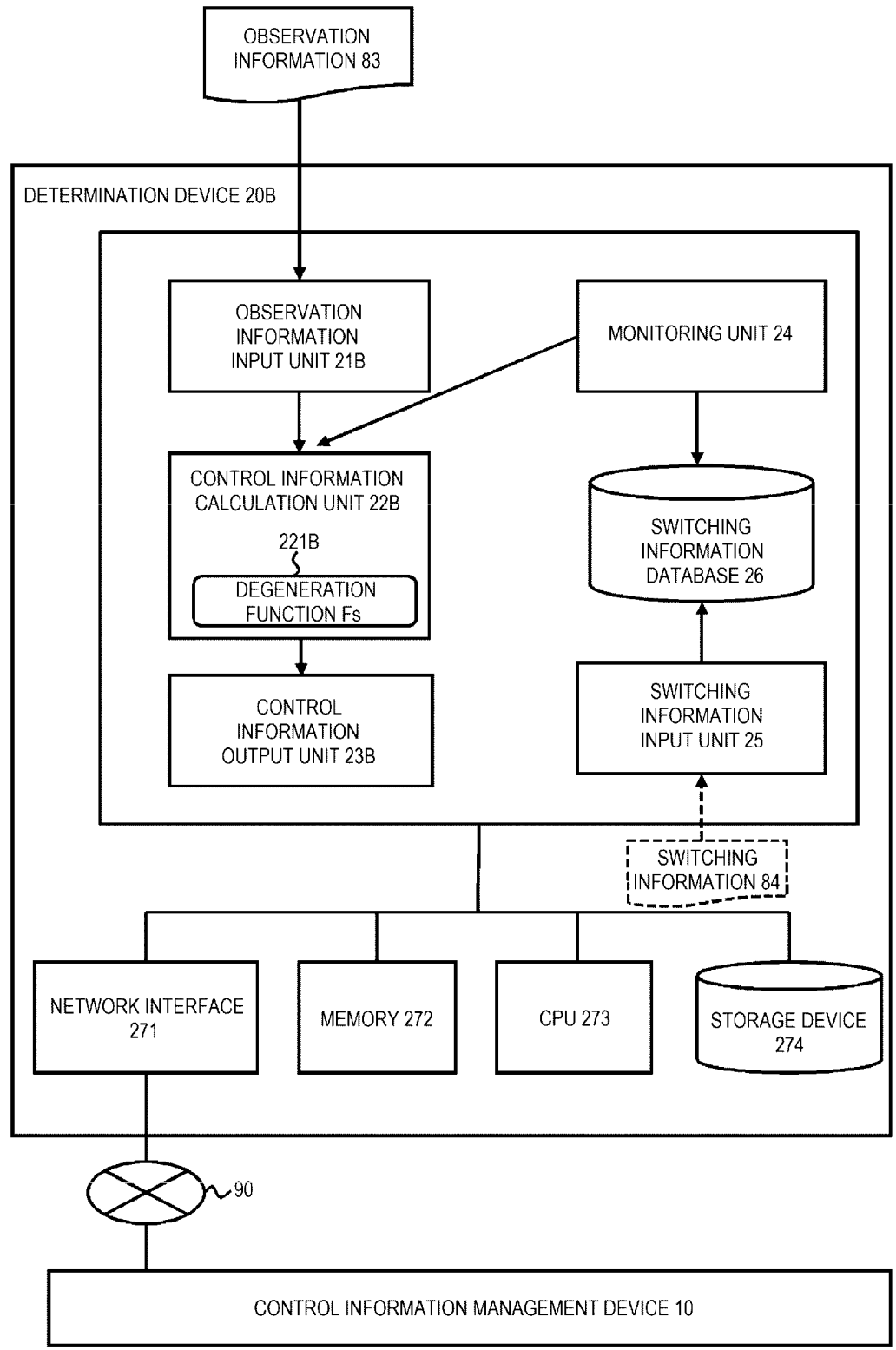

[FIG. 5]

| DETERMINATION CONDITION | FUNCTION | IMPLEMENTATION | PRIORITY | CPU CONSUMPTION | MEMORY CONSUMPTION |
|---|---|---|---|---|---|
| PFm1 | F | Fm1 | 1 | 100 | 100 |

| # | EXECUTION CONDITION | OPERATION |
|---|---|---|
| 1 | AVERAGE VALUE OF DIFFERENCE FROM CURRENT TIME TO 50 ms IS ○○ OR LESS | SWITCH TO SUB SYSTEM |
| 2 | AVERAGE VALUE OF DIFFERENCE FROM CURRENT TIME TO 100 ms IS △△ OR LESS | SWITCH TO SUB SYSTEM |
| 3 | #1 AND #2 DO NOT HOLD FROM FAILURE OCCURRENCE TO 500 ms | EMERGENCY STOP |

| DETERMINATION CONDITION | FUNCTION | IMPLEMENTATION | PRIORITY | CPU CONSUMPTION | MEMORY CONSUMPTION |
|---|---|---|---|---|---|
| PFm2 | F | Fm2 | 2 | 50 | 0 |

| # | EXECUTION CONDITION | OPERATION |
|---|---|---|
| 1 | AVERAGE VALUE OF DIFFERENCE OF CURRENT TIME IS ○○ OR LESS | SWITCH TO SUB SYSTEM |
| 2 | #1 DOES NOT HOLD FROM FAILURE OCCURRENCE TO 500 ms | EMERGENCY STOP |

| DETERMINATION CONDITION | FUNCTION | IMPLEMENTATION | PRIORITY | CPU CONSUMPTION | MEMORY CONSUMPTION |
|---|---|---|---|---|---|
| PFs1 | F | Fs1 | 1 | 80 | 150 |

| # | EXECUTION CONDITION | OPERATION |
|---|---|---|
| 1 | AVERAGE VALUE OF DIFFERENCE FROM CURRENT TIME TO 50 ms IS □□ OR LESS AND AVERAGE VALUE OF DIFFERENCE FROM CURRENT TIME TO 150 ms IS ■■ OR LESS | SWITCH TO MAIN SYSTEM |
| 2 | #1 DOES NOT HOLD FROM FAILURE OCCURRENCE TO 1000 ms | SWITCH TO MAIN SYSTEM |

| DETERMINATION CONDITION | FUNCTION | IMPLEMENTATION | PRIORITY | CPU CONSUMPTION | MEMORY CONSUMPTION |
|---|---|---|---|---|---|
| PFs2 | F | Fs2 | 2 | 30 | 0 |

| # | EXECUTION CONDITION | OPERATION |
|---|---|---|
| 1 | AVERAGE VALUE OF DIFFERENCE IS ■■ OR LESS | SWITCH TO MAIN SYSTEM |
| 2 | #1 DOES NOT HOLD FROM FAILURE OCCURRENCE TO 1000 ms | SWITCH TO MAIN SYSTEM |

[FIG. 6]

| # | DEVICE | FUNCTION | IMPLEMENTATION | SYSTEM | STATE | STORAGE DESTINATION OF CONTROL INFORMATION |
|---|---|---|---|---|---|---|
| 1 | DETERMINATION DEVICE 20A | FUNCTION F | FUNCTION Fm | MAIN SYSTEM | IN OPERATION | CONTROL INFORMATION |
| 2 | DETERMINATION DEVICE 20B | FUNCTION F | DEGENERATION FUNCTION Fs | SUB SYSTEM | STOP | AUXILIARY CONTROL INFORMATION |
| 3 | DETERMINATION DEVICE 20X | FUNCTION G | FUNCTION Gm | MAIN SYSTEM | IN RESTART | AUXILIARY CONTROL INFORMATION |
| 4 | DETERMINATION DEVICE 20Y | FUNCTION G | DEGENERATION FUNCTION Gs | SUB SYSTEM | IN OPERATION | CONTROL INFORMATION |
| : | : | : | : | : | : | : |

[FIG. 7]

| # | TIME | COMPONENT | VALUE |
|---|---|---|---|
| 1 | 9:00:00.000 | SPEEDOMETER | 50km/h |
| 2 | 9:00:01.000 | SPEEDOMETER | 52km/h |
| 3 | 9:00:01.500 | THERMOMETER | 25°C |
| : | : | : | : |

[FIG. 8]
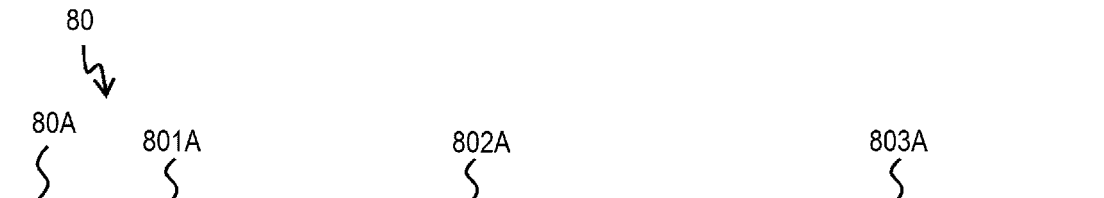
[FIG. 9]

[FIG. 10]
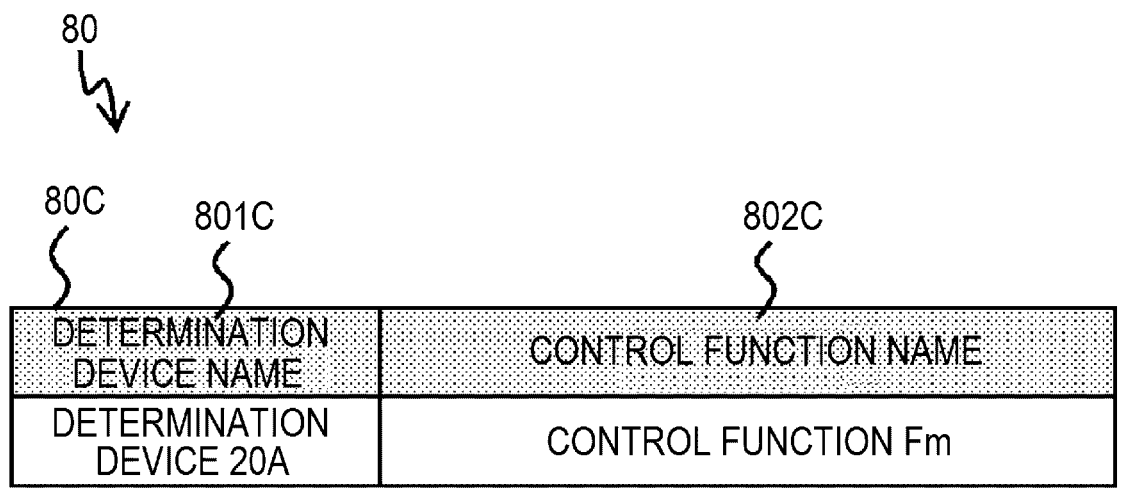
[FIG. 11]
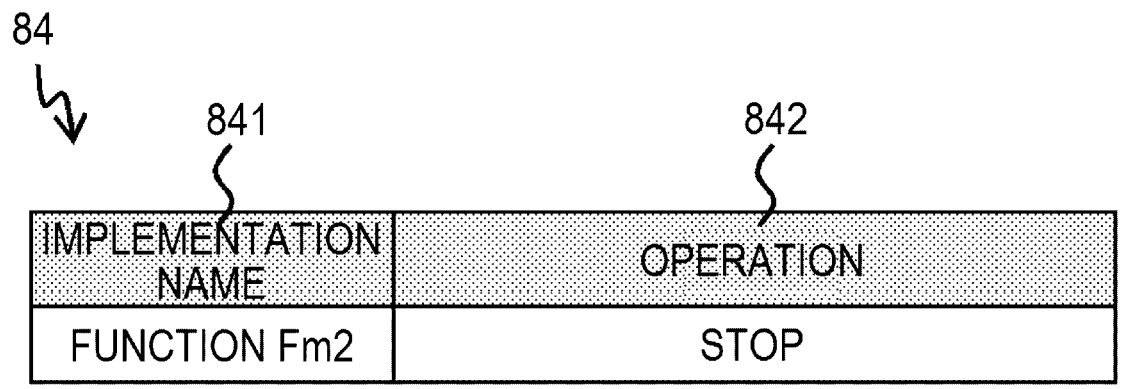

[FIG. 12]
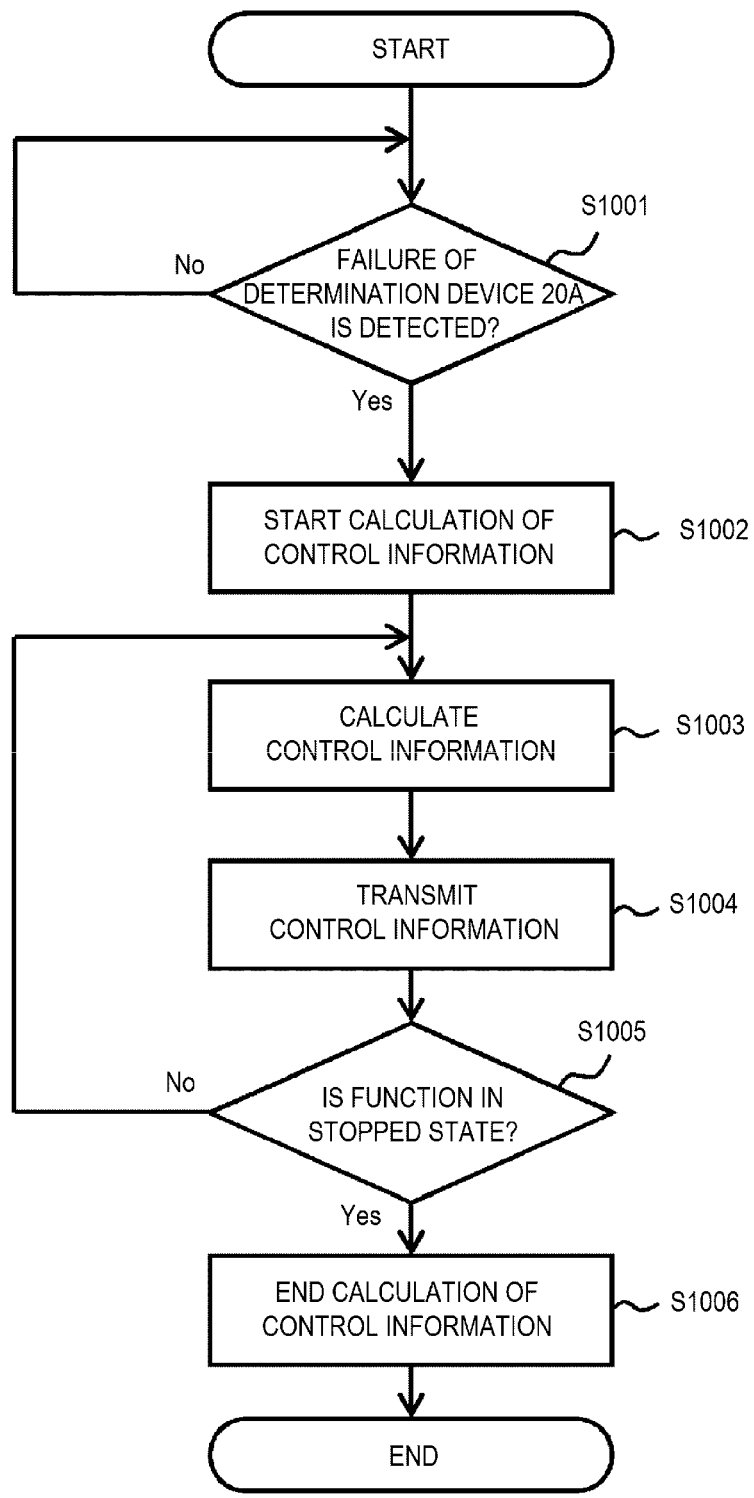

[FIG. 13]
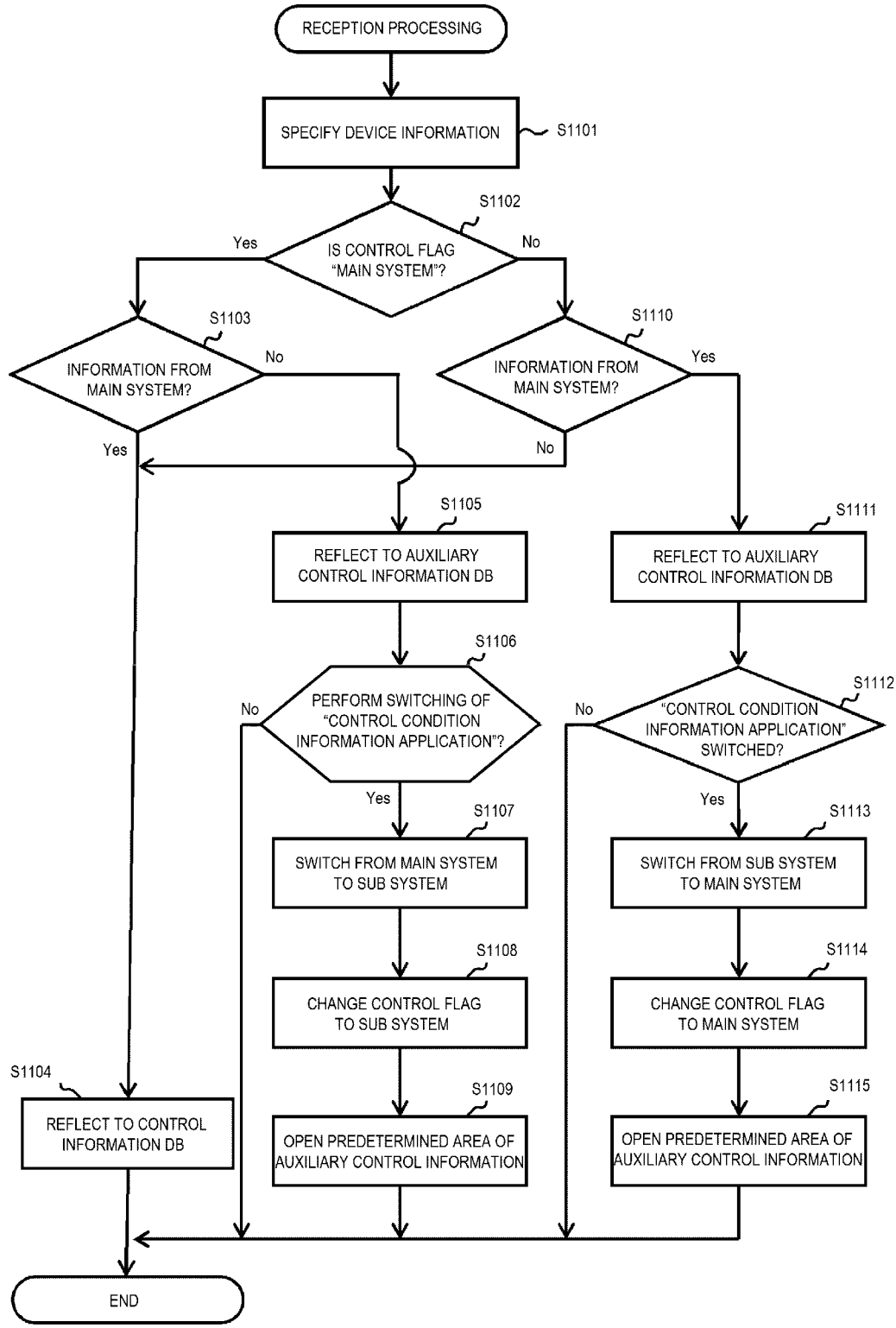

[FIG. 14]
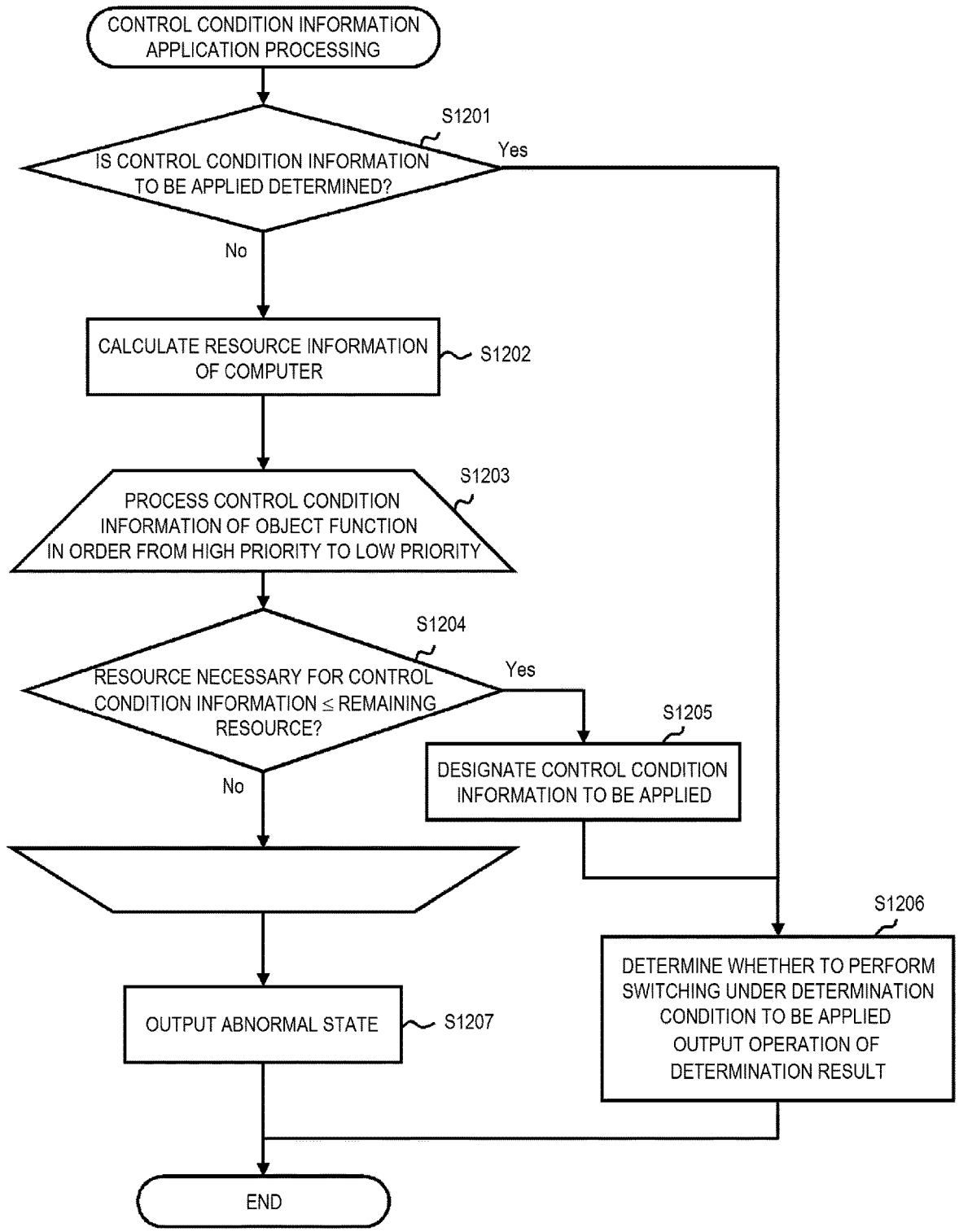

[FIG. 15]
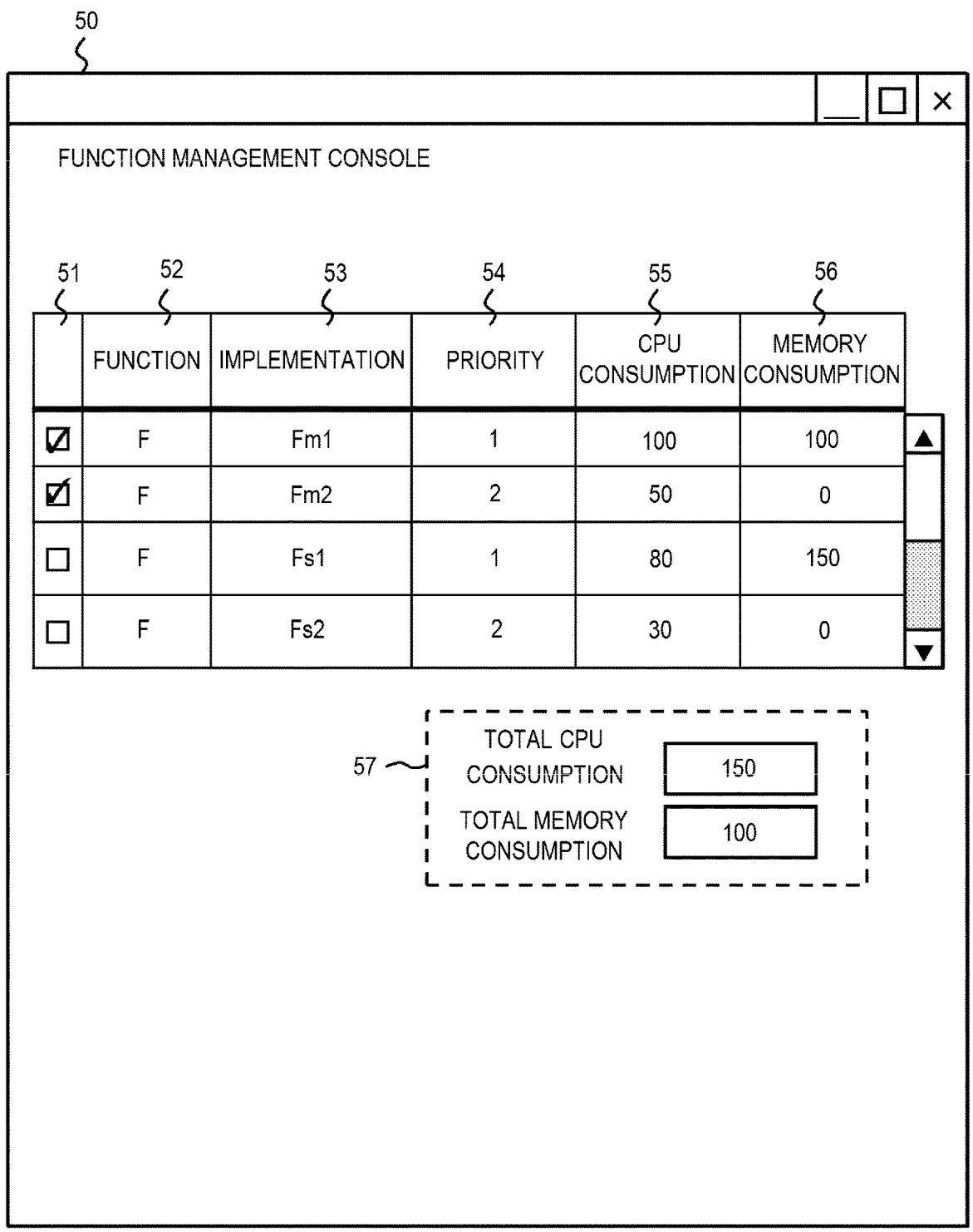

[FIG. 16]
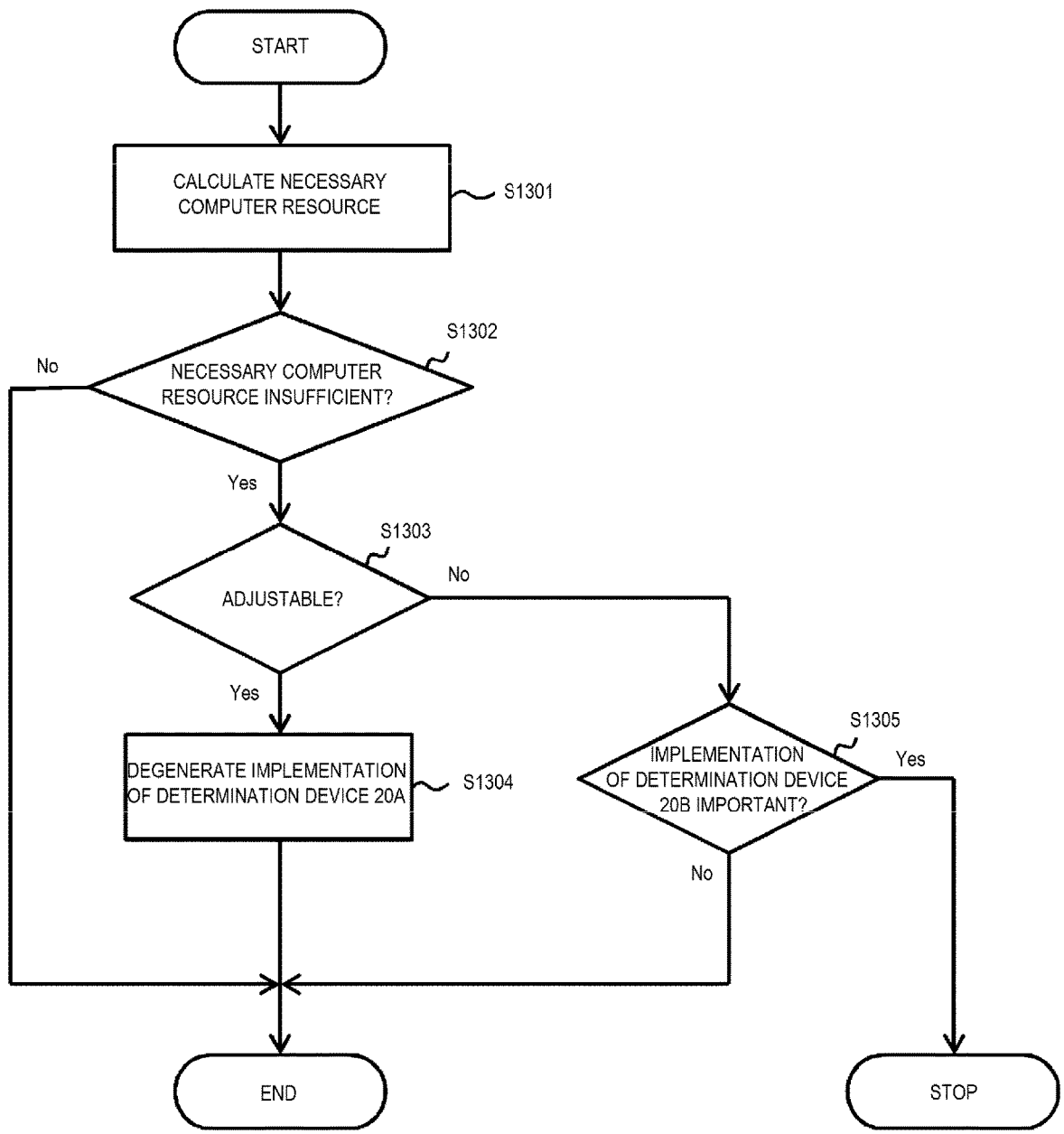

MOVING OBJECT CONTROL SYSTEM AND MOVING OBJECT CONTROL METHOD

CROSS-REFERENCE TO RELATED APPLICATIONS

This application is a U.S. National Stage entry of PCT Application No: PCT/JP2018/019873 filed May 23, 2018, which claims priority to Japanese Patent Application No. 2017-182193, filed Sep. 22, 2017, the contents of which are incorporated herein by reference.

TECHNICAL FIELD

The present invention relates to a moving object control system and a moving object control method.

BACKGROUND ART

In recent years, in industrial equipment such as vehicles, construction machines, and elevators, the influence of a defect occurring in a control system which controls the industrial equipment may be serious. Therefore, in this type of industrial equipment, when the defect occurs in a part of functions of the control system, it may be considered to replace the functions with other functions.

Thus, in the control system of the industrial equipment, a system in which a predetermined function can be replaced by another function is called system multiplexing or system redundancy.

Thus, when the defect occurs in the multiplexed or redundant control system, it is required to, from the point of view of the safety of the industrial equipment and the quality of the function, smoothly shift to an alternative function within a predetermined switching period without stopping the control over the industrial equipment.

PTL 1 discloses a technique of reducing an abrupt change in control when switching to an alternative function in a control system.

PRIOR ART LITERATURE

Patent Literature

PTL 1: JP-A-2017-33236

SUMMARY OF INVENTION

Technical Problem

However, in the control system disclosed in PTL 1, when the alternative function cannot be smoothly switched to within the predetermined switching period due to the operating state or the surrounding environment of the industrial equipment, or when a computer resource (CPU processing capability or memory capacity) of the control system is insufficient due to switching to the alternative function, appropriate control cannot be performed.

Therefore, the invention is made in view of the above problems, and an object of the invention is to appropriately perform control of a control system used for controlling industrial equipment.

Solution to Problem

In order to solve the above problems, there is provided a moving object control system, including: a device to be controlled used for an operation of a moving object; a plurality of control devices used for controlling the device to be controlled; and a motion control device different from the plurality of control devices, in which each of the plurality of control devices generates control information which defines a control content of the device to be controlled, the motion control device includes a control information comparison unit which determines a state of each of the plurality of control devices based on the control information and a control switching unit which switches the control content of each of the plurality of control devices based on a determination result of the control information comparison unit, and the control information comparison unit determines, based on the control information and a plurality of pieces of control condition information which defines control conditions of the device to be controlled by the plurality of control devices, which control condition information among the plurality of pieces of control condition information is to be applied.

Advantageous Effect

According to the invention, it is possible to appropriately perform the control of the control system used for controlling the industrial equipment.

BRIEF DESCRIPTION OF DRAWINGS

FIG. 1 is a block diagram showing a configuration of a control system according to an embodiment.

FIG. 2 is a block diagram showing a configuration of a control information management device.

FIG. 3 is a block diagram showing a configuration of a determination device.

FIG. 4 is a block diagram showing a configuration of a determination device.

FIG. 5 is a data table illustrating an example of control condition information.

FIG. 6 is a data table illustrating an example of device information.

FIG. 7 is a data table illustrating an example of observation information.

FIG. 8 is a first data table illustrating an example of control information.

FIG. 9 is a second data table illustrating an example of the control information.

FIG. 10 is a third data table illustrating an example of the control information.

FIG. 11 is a data table illustrating an example of switching information.

FIG. 12 is an example of a flowchart of switching processing in the determination device.

FIG. 13 is an example of a flowchart of reception processing of control information in the control information management device.

FIG. 14 is an example of a flowchart of control condition application processing in the control information management device.

FIG. 15 is a diagram illustrating an example of a management screen when performing function management of the control system.

FIG. 16 is a flowchart illustrating a flow of control in a control information management device according to a second embodiment.

DESCRIPTION OF EMBODIMENTS

Figure 17:
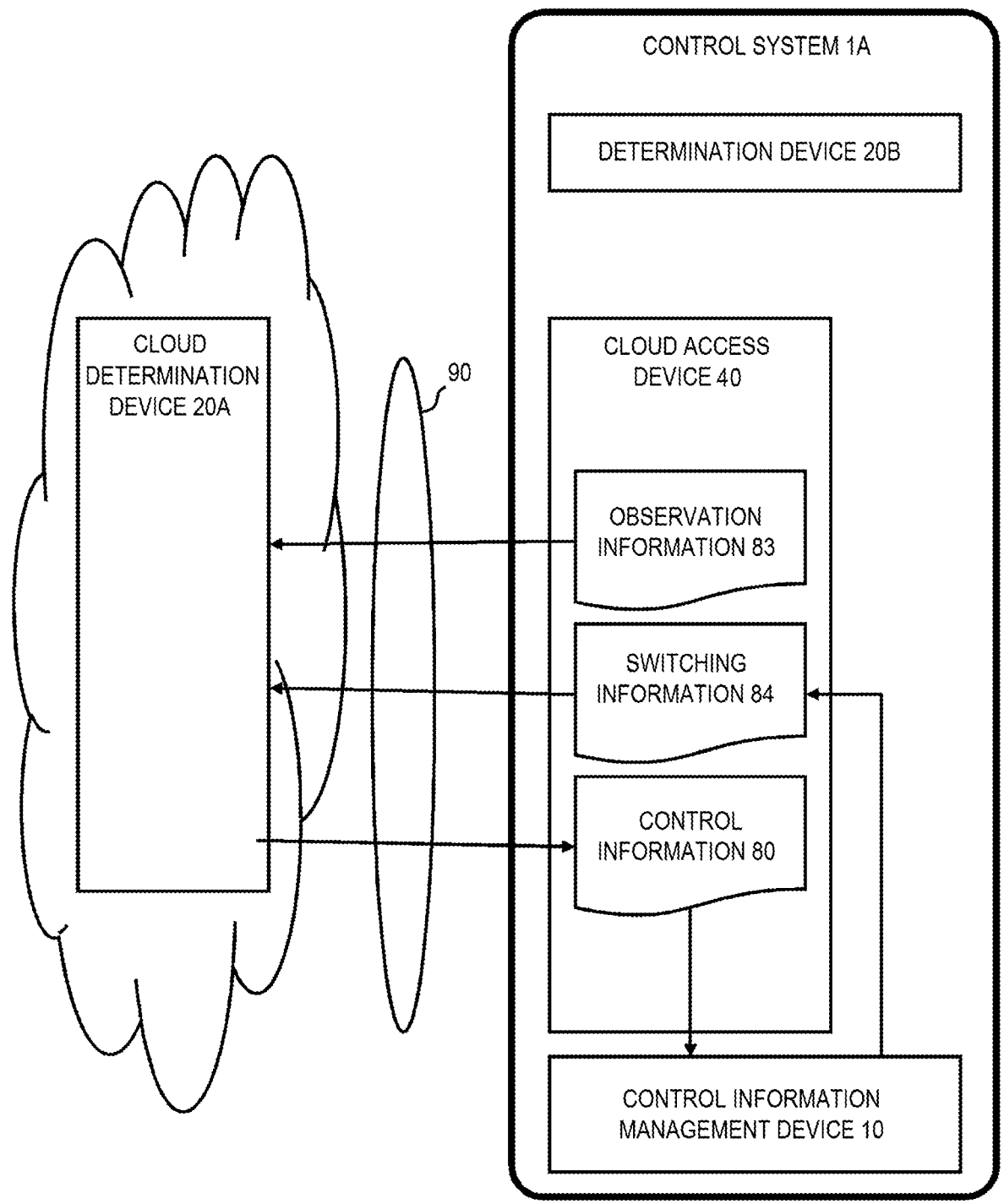
FIG. 17 is a block diagram of a configuration of a control system according to a third embodiment.

First, the meanings of terms used in embodiments to be described below are defined.

In the following description, degeneration means to, in a control device (a determination device 20 in embodiments), continue control while lowering a performance than the basic function for controlling a device to be controlled 30 or limiting the function, or switch to another function as an alternative function when a predetermined function of the control device cannot be used, or a function or a configuration thereof.

A main system means that a predetermined device to be controlled is controlled based on a basic function of an original control device, or a function, a configuration, and a path thereof.

A sub system means that a predetermined device to be controlled is controlled based not on the basic function of the main control device, but based on a limited function (degeneration function) having a performance lowered than the basic function or having the function limited, or a function, a configuration, and a path thereof.

Implementation means hardware such as an electric circuit, software (embedded software), a program, and other configurations for implementing a predetermined function in the control device.

Computer resource means a CPU consumption amount or memory capacity of a control system 1 or respective devices (control information management device 10 or determination device 20) which constitute the control system 1.

The determination device 20 is a high-rank electronic control unit (ECU) which performs the entire control in a control system of a moving object. The control information management device 10 is a low-rank ECU which controls respective actuators of the moving object.

The control system 1 according to the embodiment of the invention will be described below. In the embodiment, a case where the control system 1 is applied to a control system used for controlling a moving object such as a vehicle will be described as an example.

FIG. 1 is a block diagram showing a configuration of the control system 1 according to the embodiment.

As shown in FIG. 1, the control system 1 includes the control information management device 10, the determination device 20, and the device to be controlled 30. The control information management device 10 is connected to the determination device 20 and the device to be controlled 30 via network lines 90.

[Control Information Management Device]

FIG. 2 is a block diagram showing a configuration of the control information management device 10.

As shown in FIG. 2, the control information management device includes a control information input unit 11, a control information comparison unit 12, a control switching unit 13, a control information output unit 14, a control information database 15, and an auxiliary control information database 16.

In addition, the control information management device 10 is provided with control condition information 81 in advance which defines a control content of the device to be controlled 30 by the determination device 20.

Here, the above control condition information 81 will be described.

FIG. 5 is a data table illustrating an example of the control condition information 81.

The control condition information 81 includes a plurality of data tables (four data tables in the embodiment).

As shown in FIG. 5, in the control condition information 81, a determination condition name 811, a function name 812, an implementation 813 for implementing the function, a priority 814 of control (function), a CPU consumption amount 815, a memory consumption amount 816, an execution condition 817, and an operation 818 are associated with one another, and these are formed in a data table.

In the embodiment, a case where the control condition information 81 includes four data tables (determination condition name 811: PFm1, PFm2, PFs1, and PFs2) will be described as an example, but the number of data tables which constitutes the control condition information 81 is not limited to four. The number of data tables may be one, and may be two or more as in the embodiment.

The determination condition name 811 represents the name of respective pieces of control condition information 81 (data tables).

The function name 812 represents the name of a function to be executed in respective pieces of control condition information 81 (data tables). For example, when the function name 812 is "F", it represents a function of "moving the vehicle straight at a constant speed". For example, when the function name 812 is another name, it represents the name of each function necessary for driving the vehicle, such as "turn the vehicle along a curve" or "change the lane and overtake a leading vehicle in the same lane (for example, "G" of a function 822 shown in FIG. 6)".

The implementation 813 represents an implementation which implements the function. In the embodiment, when the implementation 813 is "Fm1" or "Fm2", it represents that the vehicle is operated to "move straight at a constant speed by the control of the main system". On the other hand, in the embodiment, when the implementation 813 is "Fs1" or "Fs2", it represents that the vehicle is operated to "move straight at a constant speed by the control of the sub system".

The priority 814 represents the priority for executing the control condition information 81 (data table). In the embodiment, when the selectable implementation 813 is "Fm1" with a priority 1 and "Fm2" with a priority 2, which are both controlled by the main system, it represents that the "Fm1" is preferentially executed. On the other hand, when the selectable implementation 813 is "Fs1" with the priority 1 and "Fs 2" with the priority 2, which are both controlled by the sub system, it represents that the "Fs1" is preferentially executed.

The CPU consumption amount 815 represents a CPU consumption amount (load) of the control system 1 when a predetermined implementation is executed.

In the embodiment, when the implementation "Fm1" is executed, it represents that the CPU consumption amount is "100". When the implementations "Fm2", "Fs1", and "Fs2" are executed, it represents that the CPU consumption amounts are "50", "80", and "30", respectively.

The memory consumption amount 816 represents a memory consumption amount of the control system 1 when a predetermined implementation is executed.

In the embodiment, when the implementation "Fm1" is executed, it represents that the memory consumption amount is "100". For example, when the entire memory capacity of the control system 1 is 300, a memory capacity of 200 remains. When the implementations "Fm2", "Fs1", and "Fs2" are executed, it represents that the memory consumption amounts are "0", "150", and "0" respectively.

The execution condition 817 is a condition (an instruction statement in the embodiment) for determining whether the control information management device 10 executes a predetermined implementation.

In the embodiment, determination conditions of "#1: the average value of the difference from the current time to 50 ms is ○○ or less", "#2: the average value of the difference from the current time to 100 ms is ΔΔ or less", and "#3: the conditions of #1 and #2 do not hold from failure occurrence to 500 ms" are set as determination conditions for whether the control information management device 10 executes the implementation "Fm1".

In addition, determination conditions of "#1: the average value of the difference of the current time is ○○ or less" and "#2: the condition of #1 does not hold from failure occurrence to 500 ms" are set as the determination conditions for whether the control information management device 10 executes the implementation "Fm2".

Further, determination conditions of "#1: the average value of the difference from the current time to 50 ms is □□ or less, and the average value of the difference from the current time to 150 ms is ■■ or less", and "#2: the condition of #1 does not hold from failure occurrence to 1000 ms" are set as determination conditions for whether the control information management device 10 executes the implementation "Fs1".

Further, determination conditions of "#1: the average value of the difference is ■■ or less", and "#2: the condition of #1 does not hold from failure occurrence to 1000 ms" are set as determination conditions for whether the control information management device 10 executes the implementation "Fs2".

The operation 818 represents an operation that the control information management device 10 causes the determination device 20 to perform when the execution condition 817 holds.

In the embodiment, there are aspects such as "switching the control of the main system to the control of the sub system (degeneration)", "emergency stop of the moving object such as a vehicle", and "switching the control of the sub system (degeneration) to the control of the main system".

In the embodiment described above, the CPU consumption amount 815 and the memory consumption amount 816 as the computer resource of the control system 1 are described as an example, but the computer resource is not limited to this. For example, the computer resource of the control system 1 may include various pieces of information related to the processing of the control system.

In the embodiment described above, the case where the operation 818 to be performed by the determination device 20 is defined when the execution condition 817 holds is described as an example, but the invention is not limited to this. The operation may be performed by the device to be controlled 30 or another device associated with the control system 1 when the execution condition 817 holds.

In the control information management device 10, device information 82 which indicates an operating state of the determination device 20 is input from the determination device 20 at a predetermined period.

Here, the device information 82 will be described.

FIG. 6 is a data table illustrating an example of the device information 82.

As shown in FIG. 6, in the device information 82, a device name 821 of the determination device 20 which transmits the device information 82, a function name 822 which represents a function to be executed by the determination device 20, a implementation name 823 which implements the function, a system name 824 which represents whether the determination device 20 is a main system or a sub system, a state 825 which represents the operating state of the determination device 20, and a storage destination 826 of the control information 80 transmitted from the determination device 20 are associated with one another, and these are formed in a data table.

The device name 821 indicates a device name for indicating that the device information 82 is transmitted from which determination device 20.

The function name 822 represents the name of the function to be performed by the determination device 20. In the embodiment, "function F" of a determination device 20A and a determination device 20B represents the function of "moving the vehicle straight at a constant speed". "Function G" of a determination device 20X and a determination device 20Y represents the function of "changing the lane and overtaking a leading vehicle in the same lane".

The implementation name 823 represents the implementation name which implements the above function. In the embodiment, when an implementation of the determination device 20A is "function Fm", it represents that the function of "moving the vehicle straight at a constant speed by the control of the main system" as described above is implemented. When an implementation of the determination device 20B is "degeneration function Fs", it represents that the function of "moving the vehicle straight at a constant speed by the control of the sub system" as described above is implemented.

An implementation "function Gm" of the determination device 20X represents an implementation which implements the function of "changing the lane and overtaking a leading vehicle in the same lane by the control of the main system". An implementation "degeneration function Gs" of the determination device 20Y represents an implementation which implements the function of "changing the lane and overtaking a leading vehicle in the same lane by the control of the sub system".

The system name 824 represents whether the determination device 20 is "main system" or "sub system". In the embodiment, the determination device 20A and the determination device 20X are devices having the function of the main system, and the determination device 20B and the determination device 20Y are devices having the function of the sub system.

The state 825 represents a state of the determination device 20. In the embodiment, the determination device 20A and the determination device 20Y show a state of being in operation, the determination device 20B represents a state of stop, and the determination device 20X represents a state of being in restart after being stopped (blocked) once.

The storage destination 826 of the control information shows information which indicates the control information 80 transmitted from the determination device 20 is stored in which database of the control information management device 10. In the embodiment, it represents that the control information 80 transmitted from the determination device 20A and the determination device 20Y is stored in the control information database 15 of the control information management device 10, and the control information 80 transmitted from the determination device 20B and the determination device 20X is stored in the auxiliary control information database 16.

The control information management device 10 refers to the device information 82 most recently input from the determination device 20. The control information management device 10 may store a plurality of pieces of device information 82 input in the past in a predetermined storage device and refer to the device information 82 input in the past at any time.

Returning to FIG. 2, the control information 80 (see FIGS. 8 to 10) transmitted from the determination device 20 is input to the control information input unit 11. The control information input unit 11 stores the input control information 80 in either the control information database 15 or the auxiliary control information database 16 based on the device information 82 (the storage destination 826 of the control information above).

The control information comparison unit 12 determines whether to switch the function of the determination device 20 based on the control information 80 stored in the control information database 15 and the auxiliary control information database 16 and the control condition information 81. When the control information comparison unit 12 determines that the function of the determination device 20 is to be switched, the control information 80 stored in the control information database 15 or the auxiliary control information database 16 is updated. Then, the control information comparison unit 12 transmits the control content to be transmitted to the determination device 20 to the control switching unit 13.

The control switching unit 13 generates switching information 84 based on the control content transmitted from the control information comparison unit 12, and transmits the switching information 84 to the determination device 20.

The control information 80 stored in the control information database 15 and the auxiliary control information database 16 is transmitted to the control information output unit 14. The control information output unit 14 transmits the control information 80 to any one of the corresponding devices to be controlled 30.

The control information management device 10 further includes, in addition to the above configuration, a network interface 171, a memory 172, a central processing unit (CPU) 173, a storage device 174, and a user interface 175.

The network interface 171 is connected to the network line 90, receives and transmits information between the determination device 20 and the device to be controlled 30.

The memory 172 is a main storage device such as a read only memory (ROM). The memory 172 stores a control program (not shown) for controlling the control information management device 10 and various data (parameters) used for controlling the control information management device 10.

The CPU 173 executes the control program (not shown) stored in the memory 172, and reads various data (parameters) as necessary to implement each function of the control information management device 10.

The storage device 174 is an auxiliary storage device such as a hard disk drive, and stores programs to be executed by the CPU 173 and various data (parameters) to be referred to by the CPU 173.

[Determination Device]

Next, the determination device 20 will be described.

FIG. 3 is a block diagram showing a configuration of the determination device 20.

FIG. 4 is a block diagram showing a configuration of the determination device 20B.

As shown in FIG. 3, the determination device 20 according to the embodiment includes two determination devices, the determination device 20A and the determination device 20B. In the embodiment, the determination device 20A is a determination device having the function of the main system, and the determination device 20B is a determination device having the function of the sub system.

[Determination Device 20A]

The determination device 20A includes an observation information input unit 21A to which observation information 83 is input, a control information calculation unit 22A, and a control information output unit 23A.

Here, the observation information 83 will be described.

FIG. 7 is a data table illustrating an example of the observation information 83.

The observation information 83 (see FIG. 7) is information generated by a measurement device inside or outside the control system 1. In the embodiment, as shown in FIG. 7, when the moving object is a vehicle, a measurement time 831, a measurement component (measurement device) 832, and a measured value 833 are associated with one another in the observation information 83, and these are formed in a data table.

In the embodiment, the component includes, for example, a speedometer (not shown) which measures the speed of the vehicle, and a thermometer (not shown) which measures the outside air temperature.

It is not necessary to list the observation information 83 in an ascending order or a descending order according to the measurement time 831. In the observation information 83, the same information may be repeatedly stored, or a plurality of pieces of information obtained by measuring the same information by different measurement devices may be included.

Returning to FIG. 3, the observation information input unit 21A transmits the input observation information 83 to the control information calculation unit 22A.

The control information calculation unit 22A includes one or more implementations 221A (in the embodiment, implementation "function Fm": function of moving the vehicle straight at a constant speed by the control of the main system) for implementing the function to be performed by the device to be controlled 30. The control information calculation unit 22A executes predetermined control processing based on the observation information 83 transmitted from the observation information input unit 21A and the implementation 221A, and generates the control information 80 used for controlling the device to be controlled 30. Then, the control information calculation unit 22A transmits the generated control information 80 to the control information output unit 23A.

Here, the control information 80 generated by the control information calculation unit 22A will be described.

FIG. 8 is a first data table 80A illustrating an example of the control information 80.

FIG. 9 is a second data table 80B illustrating an example of the control information 80.

FIG. 10 is a third data table 80C illustrating an example of the control information 80.

As shown in FIG. 8, in the first data table 80A of the control information 80, a time 801A (future time with respect to the current time) when the device to be controlled 30 is controlled, a component (device which operates a vehicle: actuator) name 802A which specifies which one of the devices to be controlled 30 is to be controlled, and a control value 803A which defines to what extent the control over the device to be controlled 30 is performed are associated with one another, and these are formed in a data table.

As shown in FIG. 9, in the second data table 80B of the control information 80, a current time 801B, and a time 802B when the calculation of the control information 80 by the control information calculation unit 22B is ended are associated with each other, and these are formed in a data table.

The time 802B when the calculation of the control information 80 by the control information calculation unit 22A is ended is the latest time among the time 801A when the control value 803A calculated by the control information calculation unit 22A exists. In the embodiment, as shown in FIG. 9, the current time is 9:00:00, and the control information 80, i.e., 3 seconds up to 9:00:03, is calculated by the control information calculation unit 22A.

As shown in FIG. 10, in the third data table 80C of the control information 80, a determination device name 801C for controlling the device to be controlled 30 and a control function name 802C are associated with each other, and these are formed in a data table form. The control function name 802C is a name of an implementation for implementing a predetermined function of the device to be controlled 30.

Returning to FIG. 3, after receiving the control information 80 from the control information calculation unit 22A, the control information output unit 23A transmits the control information 80 to the control information management device 10.

[Determination Device 20B]

As shown in FIG. 4, the determination device 20B includes an observation information input unit 21B, a control information calculation unit 22B, a control information output unit 23B, a monitoring unit 24, a switching information input unit 25, and a switching information database 26.

Similar to the observation information input unit 21A of the determination device 20A, the observation information 83 generated by the measurement device inside or outside the control system 1 is input the observation information input unit 21B. The observation information input unit 21B transmits the input observation information 83 to the control information calculation unit 22B.

The control information calculation unit 22B includes one or more implementations 221B (in the embodiment, implementation "degeneration function Fs": function of moving the vehicle straight at a constant speed by the control of the sub system) for implementing the function to be performed by the device to be controlled 30. The control information calculation unit 22B executes predetermined control processing based on the observation information 83 transmitted from the observation information input unit 21B and the implementation 221B, and generates the control information 80 used for controlling the device to be controlled 30. Then, the control information calculation unit 22B transmits the generated control information 80 to the control information output unit 23B.

After receiving the control information 80 from the control information calculation unit 22B, the control information output unit 23B transmits the control information 80 to the control information management device 10 (see FIG. 3).

The monitoring unit 24 monitors the movable state of one or more determination devices (in the embodiment, the determination device 20A) included in the determination device 20. When the monitoring unit 24 detects a change in the operating state of the determination device 20A, the control content of the control information calculation unit 22B is switched based on the content stored in the switching information database 26.

The switching information 84 transmitted from the control information management device 10 is input to the switching information input unit 25. The switching information input unit 25 updates the content stored in the switching information database 26 based on the content of the input switching information 84.

Here, the switching information 84 transmitted from the control information management device 10 will be described.

FIG. 11 is a data table illustrating an example of the switching information 84.

As shown in FIG. 11, in the switching information 84, an implementation name 841 (for example, implementation "function Fm2") for switching the function of the determination device 20 and an operation content 842 (for example, "stop") performed by the determination device 20 are associated with each other, and these are formed in a data table.

In the embodiment, the determination device 20 "stops" the operation of the determination device 20A which performs the implementation "function Fm2" based on the switching information 84.

In the embodiment, the case where the operation content 842 of the switching information 84 is "stop" is described as an example, but the operation content 842 may be not only the function of start or stop, but also the partial change of the parameter for the function in operation, or the content of changing the implementation for implementing the predetermined function of the determination device 20 to an implementation for implementing other functions.

Referring back to FIG. 4, the determination device 20B further includes a network interface 271, a memory 272, a CPU 273, and a storage device 274.

The network interface 271 is connected to the network line 90, and receives and transmits information from and to the control information management device 10.

The memory 272 is a main storage device such as ROM, and the memory 272 stores a control program (not shown) for controlling the determination device 20B and various data (parameters) used for controlling the determination device 20B.

The CPU 273 executes the control program (not shown) stored in the memory 272, and reads various data (parameters) as necessary to implement each function of the determination device 20B.

The storage device 274 is an auxiliary storage device such as a hard disk drive, and stores programs to be executed by the CPU 273 and various data (parameters) to be referred to by the CPU 273.

The above determination device 20A also has the same network interface, memory, CPU, and storage device (not shown), but the detailed description is omitted.

The control information 80 generated by the determination device 20A or the determination device 20B is transmitted to the device to be controlled 30 (see FIG. 1) via the control information management device 10, and the device to be controlled 30 is controlled based on the control information 80.

[Device to be Controlled]

Returning to FIG. 1, the device to be controlled 30 is one or more component devices which constitute a vehicle, and the vehicle is controlled by the device to be controlled 30.

For example, the device to be controlled 30 is a device (actuator) such as a steering, an accelerator, or a brake used for controlling the vehicle.

[Switching Processing]

Next, the switching processing in the determination device 20B will be described.

FIG. 12 is an example of a flowchart of the switching processing in the determination device 20B.

In the embodiment, the determination device 20A is a device having the function of the main system (holding), and the determination device 20B is a device having the function of the sub system (degeneration). Therefore, the monitoring unit 24 is provided in the determination device 20B which performs the function of the sub system (degeneration), and monitors the operating state of the determination device 20A which has the function of the main system (holding) for each predetermined period.

As shown in FIG. 12, in step S1001, the CPU 273 of the determination device 20B determines whether the monitoring unit 24 detects a change in the operating state of the determination device 20A (a failure such as function stop). When the CPU 273 determines that a change in the operating state is detected (step S1001: Yes), the process proceeds to step S1002, and when the CPU 273 determines that no change is detected (step S1001: No), the determination processing (step S1001) is repeated until a change is detected.

In step S1002, after executing the predetermined pre-processing, the CPU 273 changes the content of the switching information database 26 to be that the function is in execution, and starts the calculation of the control information 80.

In step S1003, the CPU 273 calculates the control information 80 based on the observation information 83.

In step S1004, the CPU 273 transmits the control information 80 calculated in step S1003 to the control information management device 10 at a predetermined timing.

In step S1005, the CPU 273 refers to the switching information database 26 and determines whether the function is in a stopped state. When the CPU 273 determines that the function is in the stopped state (step S1005: Yes), the process proceeds to step S1006. When the CPU 273 determines the function is not in the stopped state (step S1005: No), the process returns to step S1003, and the CPU 273 repeats the processing of calculating the control information 80 (step S1003), the processing of transmitting the calculated control information 80 (step S1004), and the processing of referring to the switching information database 26 and determining whether the function is in the stopped state (step S1005), and controls the device to be controlled 30 to continually execute the function.

When the CPU 273 determines that the function is in the stopped state (step S1005: Yes) in step S1005, the CPU 273 ends the processing of calculating the control information 80 in step S1006.

[Control Information Reception Processing]

Next, a reception processing of the control information 80 in the control information management device 10 will be described.

FIG. 13 is an example of a flowchart of the reception processing of the control information 80 in the control information management device 10.

This processing is executed when the control information input unit 11 of the control information management device 10 receives the control information 80 transmitted from the determination device 20.

In step S1101, the CPU 173 of the control information management device 10 specifies a corresponding row of the device information 82 based on the determination device name 801C and the control function name 802C of the third data table 80C (see FIG. 10) of the control information 80 input to the control information input unit 11, and acquires information related to the function of the determination device 20.

In the embodiment, the CPU 173 is a device of specifying a predetermined row (#1) of the device information 82 based on "determination device 20A" of the determination device name 801C and "control function Fm" of the control function name 802C of the third data table 80C (see FIG. 10), and performing control by the function of the main system currently in operation, and acquires information that the storage destination of the control information 80 is the control information database 15.

In step S1102, the CPU 173 determines whether the operating function is a function of a main system based on the acquired device information 82, and when it is determined to be a main system (step S1102: Yes), the process proceeds to step S1103, and when it is determined to be not a main system (step S1102: No), the process proceeds to step S1110.

In step S1103, the CPU 173 determines, based on the control information 80 received from the determination device 20, whether the information is from the determination device 20 having the function of the main system, and when it is determined that the information is from the determination device 20 having the function of the main system (step S1103: Yes), the process proceeds to step S1104, where the control information 80 received from the determination device 20 is stored in the control information database 15, and the processing is ended.

The CPU 173 may determine, based on the information of the determination device 20 included in the control information 80, whether the operating function is a function of a main system or a sub system, or may determine the above based on the fact that which network line the information is received from after diving the communication network line between the main system and the sub system.

When the CPU 173 determines that the control information 80 is not information from the determination device 20 having the function of the main system (step S1103: No), the process proceeds to step S1105, and the control information 80 is stored in the auxiliary control information database 16.

In step S1106, the CPU 173 executes control condition information application processing, and as a result, determines whether switching of the control condition information 81 (implementation) is necessary, and when the CPU 173 determines that switching is necessary (step S1106: Yes), the process proceeds to step S1107, where the control condition information 81 is switched from the control condition information 81 (implementation) which operates with the function of the main system to the control condition information 81 (implementation) which operates with the function of the sub system.

The control condition information application processing (step S1106) will be described later.

In step S1108, the CPU 173 changes the system name 824 of the device information 82 from the main system to the sub system.

In step S1109, the CPU 173 opens the corresponding predetermined content of the auxiliary control information database 16, which becomes unnecessary, and ends the processing.

On the other hand, in step S1102, when the CPU 173 determines that the operation of the determination device 20 defined by the device information 82 is not the operation of the main system (step S1102: No), the process proceeds to step S1110, where the CPU 173 determines whether the function actually operating in the determination device 20 is a function of a main system.

In step S1110, when the CPU 173 determines that the operating function is a function of a main system (step S1110: Yes), the process proceeds to step S1111, and when the CPU 173 determines that the operating function is not a function of a main system (step S1110: No), the process proceeds to step S1104, and the control information 80 received from the determination device 20 is stored in the control information database 15, and the processing is ended.

The CPU 173 may determine, based on the information of the determination device 20 included in the control information 80, whether the operating function is a function of a main system or a sub system, or may determine the above based on the fact that which network line the information is received from after diving the communication network line between the main system and the sub system.

In step S1111, the CPU 173 stores the control information 80 in the auxiliary control information database 16.

In step S1112, the CPU 173 executes control condition information application processing, and as a result, determines whether switching of the control condition information 81 (implementation) is necessary, and when the CPU 173 determines that switching is necessary (step S1112: Yes), the process proceeds to step S1113, where the control condition information 81 is switched from the control condition information 81 (implementation) which operates with the function of the sub system to the control condition information 81 (implementation) which operates with the function of the main system.

The control condition information application processing (step S1112) will be described later.

In step S1114, the CPU 173 changes the system name 824 of the device information 82 from the sub system to the main system.

In step S1115, the CPU 173 opens the corresponding predetermined content of the auxiliary control information database 16, which becomes unnecessary, and ends the processing.

[Control Condition Information Application Processing]

Next, the control condition information application processing (steps S1106 and S1112) in the control information management device 10 described above will be described.

FIG. 14 is an example of a flowchart of the control condition information application processing in the control information management device 10.

First, in step S1201, the CPU 173 determines whether the control condition information 81 to be applied is determined, and when the CPU 173 determines that the control condition information 81 to be applied is determined (step S1201: Yes), the process proceeds to step S1206, where the control is performed in accordance with the execution condition 817 of the control condition information 81 to be applied, and a predetermined operation (operation 818 in FIG. 5) is acquired.

When the CPU 173 determines that the control condition information 81 to be applied is not determined (step S1201: No), the process proceeds to step S1202 to calculate a computer resource (CPU processing capability or memory capacity) of the control system 1.

Based on the priority 814 of the function defined by the control condition information 81, the CPU 173 repeats the processing of step S1204 described later until the processing of all the control condition information 81 is ended in the order from a high priority to a low priority.

In step S1204, the CPU 173 determines whether the necessary computer resource necessary for the control based on the control condition information 81 is equal to or less than the computer resource calculated in step S1202.

When the CPU 173 determines that the necessary computer resource necessary for the control based on the control condition information 81 is equal to or less than the computer resource calculated in step S1202 (step S1204: Yes), the process proceeds to step S1205, where the control condition information 81 is designated as the control condition information to be applied to the control, and then the process proceeds to step S1206, where the control is performed in accordance with the execution condition 817 of the control condition information 81 to be applied, and a predetermined operation (operation 818 in FIG. 5) is acquired.

When the CPU 173 determines that all necessary computer resources necessary for the control based on the control condition information 81 exceed the computer resources calculated in step S1202 (step S1204: No), the process proceeds to step S1207, where the CPU 173 determines that there is no applicable control condition information 81, and abnormality processing control is performed.

The abnormality processing control refers to, for example, outputting an error indicating an abnormal state of the control system 1 and forcibly stopping the vehicle at a safe place and then ending the processing.

[Function Management Screen]

Next, a management screen 50 when performing function management of the control system 1 according to the embodiment will be described.

FIG. 15 is a diagram illustrating an example of the management screen 50 when performing the function management of the control system 1.

For example, the function management (function setting) of the control system 1 is performed in the factory before shipment of the vehicle.

As shown in FIG. 15, in the management screen 50 of the control system 1, information such as a check column 51, a function 52, an implementation 53, a priority 54, a CPU consumption amount 55, and a memory consumption amount 56 is displayed, and the operator can select which function is to be set while viewing these pieces of information.

In the embodiment, the operator selects the implementation Fm1 and the implementation Fm2, and the total CPU consumption amounts (150) and the total memory consumption amounts (100) at that time are displayed on a total display unit 57. The operator compares and examines the numerical values displayed on the total display unit 57 with the CPU performance and memory capacity of the vehicle, and determines which function is to be implemented on the vehicle.

In this way, the operator can perform efficiently and quickly the implementation to be set in the vehicle by comparing and examining the vehicle performance with the CPU consumption amount and the memory consumption amount while viewing the same.

As described above, in the embodiment, (1) the device to be controlled 30 used for an operation of the vehicle (moving object), the determination device 20 (a plurality of control devices) used for controlling the device to be controlled 30, and a control information management device 10 (motion control device) different from the determination device 20 are included, in which the determination device 20 generates the control information 80 which defines the control content of the device to be controlled 30, the control information management device 10 includes the control information comparison unit 12 which determines the operating state of the determination device 20 based on the control information 80, and the control switching unit 13 which changes the control of the determination device 20 based on the determination result of the control information comparison unit 12, and the control information comparison unit 12 determines which control condition information 81 among the plurality of pieces of control condition information 81 is to be applied based on the control information 80 and the plurality of pieces of control condition information 81 (data tables) which define the control conditions of the device to be controlled 30 by the determination device 20.

With this configuration, the control information comparison unit 12 determines which control condition information among the plurality of pieces of control condition information 81 is to be applied based on the control information 80 and the plurality of pieces of control condition information 81. Therefore, since the functions of a plurality of determination devices 20 are appropriately switched based on the control condition information 81, it is possible to appropriately perform the control of the control system 1.

(2) In addition, a computer resource calculation unit (a function of computer resource calculation processing by the control information comparison unit 12 in S1202) which calculates the computer resource (CPU processing capability and memory capacity) of the control system 1 is included, in which the control condition information 81 has necessary computer resources (CPU consumption amount 815 and memory consumption amount 816) necessary for controlling the device to be controlled 30 by the plurality of determination devices 20, and the control information comparison unit 12 determines which control condition information among the plurality of pieces of control condition information 81 is to be applied based on the control information 80, the necessary computer resources (CPU consumption amount 815 and memory consumption amount 816) of the control condition information 81, and the computer resource of the control system 1.

With this configuration, since the control information comparison unit 12 determines which control condition information among the plurality of pieces of control condition information 81 is to be applied based on the necessary computer resources (CPU consumption amount 815 and memory consumption amount 816) of the control condition information 81 and the computer resource of the control system 1, the optimal control condition information 81 can be determined in a range not exceeding the CPU processing capability and the memory capacity of the control system 1. Therefore, it is possible to appropriately perform the control of the control system 1 based on the control condition information 81.

(3) Further, when the control information comparison unit 12 determines that none of the plurality of pieces of control condition information 81 can be applied (step S1204 in the control condition information application processing in the control information comparison unit 12), the control system 1 is determined to be in an abnormal state, and the control over the device to be controlled 30 by the determination device 20 is stopped (the abnormality processing control in step S1207 of the control condition information application processing in the control information comparison unit 12 is executed).

With this configuration, the control information comparison unit 12 forcibly stops the vehicle at a safe place by the abnormality processing control (step S1207) along with the forced stop of the device to be controlled 30 of the vehicle. Therefore, the holding of the dangerous state can be avoided in which any control over the device to be controlled 30 cannot be performed by the determination device 20, and the vehicle can be safely stopped.

(4) Further, the determination device 20 and the control information management device 10 are provided in the vehicle, and the device to be controlled 30 is an actuator which controls a steering, an accelerator, or a brake used for an operation of the vehicle.

In a moving object such as a vehicle, the position of the vehicle changes every moment. Therefore, when there is a defect in the determination device 20 which controls the vehicle (device to be controlled 30), quick switching of the determination device 20 is particularly required.

When the control system 1 of the embodiment is applied to a vehicle, switching of the determination device 20 which controls the vehicle is appropriately performed, and relief and safety of the driver can be ensured.

A part of the configuration of the control information management device 10 may be provided in the determination device 20.

For example, in FIG. 1, the control information comparison unit 12 and the control switching unit 13 of the control information management device 10 may be provided in the determination device 20, and the control condition information 81 used in the processing of the control information comparison unit 12 may be provided in advance in the determination device 20. In this case, the device information 82 may be stored in the determination device 20 instead of being input to the control information management device 10 (see a dashed line in FIG. 1).

In this way, since arithmetic processing of the control information comparison unit 12 and the control switching unit 13 can be performed on a high-rank control device (determination device 20) having higher performance, accurate and quick control can be performed. In addition, since the low-rank control device (control information management device 10) is only an input unit, an output unit, and a database of the information, a simpler and inexpensive ECU can be used, and the entire control system can be more efficient.

Second Embodiment

Next, a flow of control in a control information management device 10A according to a second embodiment will be described.

FIG. 16 is a flowchart illustrating a flow of control in the control information management device 10A according to the second embodiment.

The control information management device 10A according to the second embodiment is different from that of the above embodiment in that a predetermined preceding function is in execution currently, and a subsequent function having a priority of execution higher than that of the preceding function is scheduled to be executed next, when the subsequent function is executed and when the necessary computer resource necessary for executing the subsequent function exceeds the computer resource of the control system, the necessary computer resource is reduced by shifting the preceding function to a degeneration function, and when the subsequent function can be executed, the subsequent function is executed by shifting the preceding function to the degeneration function.

In step S1301, the CPU 173 calculates necessary computer resources (CPU consumption amount and memory consumption amount) necessary for the control based on the control condition information 81.

In step S1302, the CPU 173 determines whether the computer resources (CPU processing capability and memory capacity) of the control system 1 are insufficient with respect to the necessary computer resource calculated in step S1301, and when the CPU 173 determines that there is sufficient computer resource (step S1302: No), the processing is ended, and the CPU 173 continues the control based on this control condition information 81.

When the CPU 173 determines the computer resources (CPU processing capability and memory capacity) of the control system 1 are insufficient with respect to the necessary computer resource calculated in step S1301 (step S1302: Yes), the process proceeds to step S1303, where the CPU 173 determines whether a function of an implementation of the determination device 20B as a sub system can be performed by degenerating an implementation of the determination device 20A as a main system (adjustable or not).

In step S1303, when the CPU 173 determines that it is adjustable (step S1303: Yes), the process proceeds to step S1304, where processing of degenerating the implementation of the determination device 20A is performed, and the processing is ended.

In step S1303, when the CPU 173 determines that it is not adjustable (step S1303: No), in step S1305, the CPU 173 determines whether the function of the implementation of the determination device 20B as a sub system is important, and when CPU 173 determines that it is important (step S1305: Yes), the vehicle is stopped while the safety thereof is ensured, and the processing is ended, since no processing can be performed.

In step S1305, when the CPU 173 determines that the function of the implementation of the determination device 20B is not important (step S1305: No), the function of the implementation of the determination device 20A having a low priority is performed as it is, and the processing is ended.

As described above, in the second embodiment, (5) a plurality of determination devices 20 includes the determination device 20A which has a first function (for example, the implementation 813 of the control condition information 81 in FIG. 5 at the second top data table) of controlling the device to be controlled 30 in a predetermined manner and the determination device 20B which has a second function (for example, the implementation 813 of the control condition information 81 in FIG. 5 at the top data table) of controlling the device to be controlled 30 with a priority (priority 814 of the control condition information 81) higher than that of the first function (implementation 813) of the determination device 20A, in which the control information comparison unit 12 causes the first function of the determination device 20A to shift to a degeneration function, when the control over the device to be controlled 30 by the determination device 20A based on the implementation 813 is being executed, the control over the device to be controlled 30 by the determination device 20B based on the implementation 813 is scheduled to be executed and the necessary computer resource necessary for controlling the device to be controlled 30 by the determination device 20B exceeds the computer resource of the control system 1, and when the necessary computer resource necessary for controlling the device to be controlled 30 by the determination device 20B is made equal to or less than the computer resource of the control system 1 by shifting the first function (the implementation 813 in the second top data table in FIG. 5) of the determination device 20A to the degeneration function.

With this configuration, even when the control over the device to be controlled 30 by the determination device 20A having a low priority is being executed, since the control over the device to be controlled 30 by the determination device 20B having the high priority is given priority when the necessary computer resource necessary for controlling the device to be controlled 30 by the determination device 20B having a high priority is made equal to or less than the computer resource of the control system 1 by shifting the function of the determination device 20A to the degeneration function, it is possible to more appropriately control the device to be controlled 30 by the determination device 20.

Third Embodiment

Next, a control system 1A according to a third embodiment will be described.

FIG. 17 is a block diagram of a configuration of the control system 1A according to the third embodiment.

The control system 1A is different from the above embodiment in which all the components of the control system 1 are provided in the vehicle in that the control system 1A is configured by partially using cloud computing (hereinafter referred to as cloud).

As shown in FIG. 17, in the control system 1A, the determination device 20A having the function of the main system is provided on the cloud, and the determination device 20B having the function of the sub system is provided in the vehicle.

The control system 1A includes a cloud access device 40, and the determination device 20B in the vehicle can receive information from the determination device 20A on the cloud and transmit information to the determination device 20A via the cloud access device 40 and the network line 90.

Specifically, information communication is performed between the determination device 20B in the vehicle and the determination device 20A on the cloud via the cloud access device 40 for the control information 80, the observation information 83, and the switching information 84.

(6) As described above, in the third embodiment, any one of the determination device 20 and the control information management device 10 is provided in a device (server) different from the moving object (vehicle), and the determination device 20 and the control information management device 10 are connected via the network line 90 of cloud computing.

With this configuration, the control system of the vehicle can be simplified, and the manufacturing cost of the vehicle can be reduced. Further, since the motion control of the vehicle is not affected even if the number of the determination devices 20 increases, a plurality of determination devices 20A can be provided. Accordingly, redundancy of the control system can be performed more reliably.

Even after the vehicle is shipped, it is possible to change the specification (function or parameter) of the determination device 20A on the cloud.

An example of the embodiment of the invention is described above, but the invention may combine all of the embodiments above, or any two or more embodiments may be suitably combined in any desired manner.

In the embodiment above, the case where the control system 1 is applied to a vehicle is described as an example, but the control system 1 is not limited to a vehicle, and can be suitably applied to all moving objects such as, for example, a construction machine, an escalator, an elevator, a railway, a ship, an aircraft, and a drone.

The invention is not limited to the configuration having all the configurations of the above embodiments, and a part of the configuration of the above embodiments may be replaced with the configuration of the other embodiments, and the configuration of the above embodiment may be replaced with the configuration of another embodiment.

A part of the configuration of the above embodiment may be added, deleted, or replaced with the configuration of another embodiment.

REFERENCE SIGN LIST

1: control system
10: control information management device
11: control information input unit
12: control information comparison unit
13: control switching unit
14: control information output unit
15: control information database
16: auxiliary control information database
171: network interface
172: memory
173: CPU
174: storage device
175: user interface
20, 20A, 20B: determination device
21A, 21B: observation information input unit
22A, 22B: control information calculation unit
23A, 23B: control information output unit
24: monitoring unit
25: switching information input unit
26: switching information database
271: network interface
272: memory
273: CPU
274: storage device
30: device to be controlled
80: control information
81: control condition information
82: device information
83: observation information
84: switching information
90: network line

The invention claimed is:

1. A moving object control system, comprising:
a device to be controlled used for an operation of a moving object;
a plurality of control devices used for controlling the device to be controlled; and
a motion control device different from the plurality of control devices,
wherein
each of the plurality of control devices generates control information which defines a control content of the device to be controlled,
the motion control device includes
a control information comparison unit which determines a state of each of the plurality of control devices based on the control information, and
a control switching unit which switches the control content of each of the plurality of control devices based on a determination result of the control information comparison unit, including shifting a first function of controlling the device to be controlled to a degeneration function, which continues controlling the device to be controlled while lowering or limiting performance, when resources are insufficient to continue using the first function to control the device to be controlled, and
the control information comparison unit determines, based on the control information and a plurality of pieces of control condition information which define control conditions of the device to be controlled by the plurality of control devices, which control condition information among the plurality of pieces of control condition information is to be applied.

2. The moving object control system according to claim 1, further comprising:
a computer resource calculation unit which calculates a computer resource of the control system,
wherein
the control condition information includes a necessary computer resource necessary for control of the device to be controlled by the control device, and
the control information comparison unit determines which control condition information among the plurality of pieces of control condition information is to be applied based on the control information, the necessary computer resource, and the computer resource.

3. The moving object control system according to claim 2, wherein
the plurality of control devices includes a first control device which has the first function of controlling the device to be controlled in a predetermined manner and a second control device which has a second function of controlling the device to be controlled with a priority higher than that of the first function of the first control device, and
the control information comparison unit causes the first function of the first control device to shift to the degeneration function, when control over the device to be controlled by the first control device based on the first function is being executed, control over the device to be controlled by the second control device based on the second function is scheduled to be executed, and the necessary computer resource necessary for controlling the device to be controlled by the second control device exceeds the computer resource of the control system, and when the necessary computer resource necessary for controlling the device to be controlled by the second control device is made equal to or less than the computer resource of the control system by shifting the first function of the first control device to the degeneration function.

4. The moving object control system according to claim 3, wherein when the control information comparison unit determines that none of the plurality of pieces of control condition information can be applied, the control system is determined to be in an abnormal state, and the device to be controlled is controlled by abnormality processing control.

5. The moving object control system according to claim 1, wherein
the control device and the motion control device are provided in a vehicle, and
the device to be controlled is an actuator which controls a steering, an accelerator, or a brake used for an operation of the vehicle.

6. The moving object control system according to claim 1, wherein any one among the control devices and the motion control device is provided in a device different from the moving object, and the control devices and the motion control device are connected by a cloud computing computer network.

7. A moving object control system, comprising:
a device to be controlled used for an operation of a moving object; and
a plurality of control devices used for controlling the device to be controlled,
wherein
each of the plurality of control devices generates control information which defines a control content of the device to be controlled, a control information comparison unit which determines a state of each of the plurality of control devices based on the control information is included, and a control switching unit which switches the control content of each of the plurality of control devices based on a determination result of the control information comparison unit is included, wherein the control switching unit shifts a first function of controlling the device to be controlled to a degeneration function, which continues controlling the device to be controlled while lowering or limiting performance, when resources are insufficient to continue using the first function to control the device to be controlled, and the control information comparison unit determines, based on the control information and a plurality of pieces of control condition information which define control conditions of the device to be controlled by the control devices, which control condition information among the plurality of pieces of control condition information is to be applied.

8. A moving object control method in a control system, in which a device to be controlled used for an operation of a moving object and a plurality of control devices used for controlling the device to be controlled are included, the method comprising:

receiving control information which defines a control content of the device to be controlled;

determining a state of each of the plurality of control devices based on the control information;

determining, based on the control information and a plurality of pieces of control condition information which defines control conditions of the device to be controlled by the plurality of control devices, which control condition information among the plurality of pieces of control condition information is to be applied; and switching the control content of at least one of the plurality of control devices including shifting a first function of controlling the device to be controlled to a degeneration function, which continues controlling the device to be controlled while lowering or limiting performance, when resources are insufficient to continue using the first function to control the device to be controlled.

9. The moving object control method according to claim 8, further comprising:

calculating a computer resource of the control system; and acquiring a necessary computer resource necessary for controlling the device to be controlled by the control device, wherein determining which control condition information among the plurality of pieces of control condition information is to be applied is to determine which control condition information among the plurality of pieces of control condition information is to be applied based on the control information, the necessary computer resource, and the computer resource.

10. The moving object control method according to claim 9, in which the plurality of control devices includes a first control device which has the first function of controlling the device to be controlled in a predetermined manner and a second control device which has a second function of controlling the device to be controlled with a priority higher than that of the first function of the first control device, the method comprising:

determining whether a necessary computer resource necessary for controlling the device to be controlled by the second control device based on the second function exceeds the computer resource of the control system; and determining whether a necessary computer resource necessary for controlling the device to be controlled by the second control device based on the second function is equal to or less than the computer resource of the control system by shifting the first function of the first control device in execution to the degeneration function, wherein shifting the first function of the first control device to the degeneration function is included when the necessary computer resource for controlling the device to be controlled by the second control device based on the second function is made equal to or less than the computer resource of the control system by shifting the first function of the first control device to the degeneration function.

11. The moving object control method according to claim 8, further comprising, when it is determined that none of the plurality of pieces of control condition information can be applied, determining the control system to be in an abnormal state, and controlling the device to be controlled by abnormality processing control.

* * * * *